United States Patent Office 3,258,903
Patented July 5, 1966

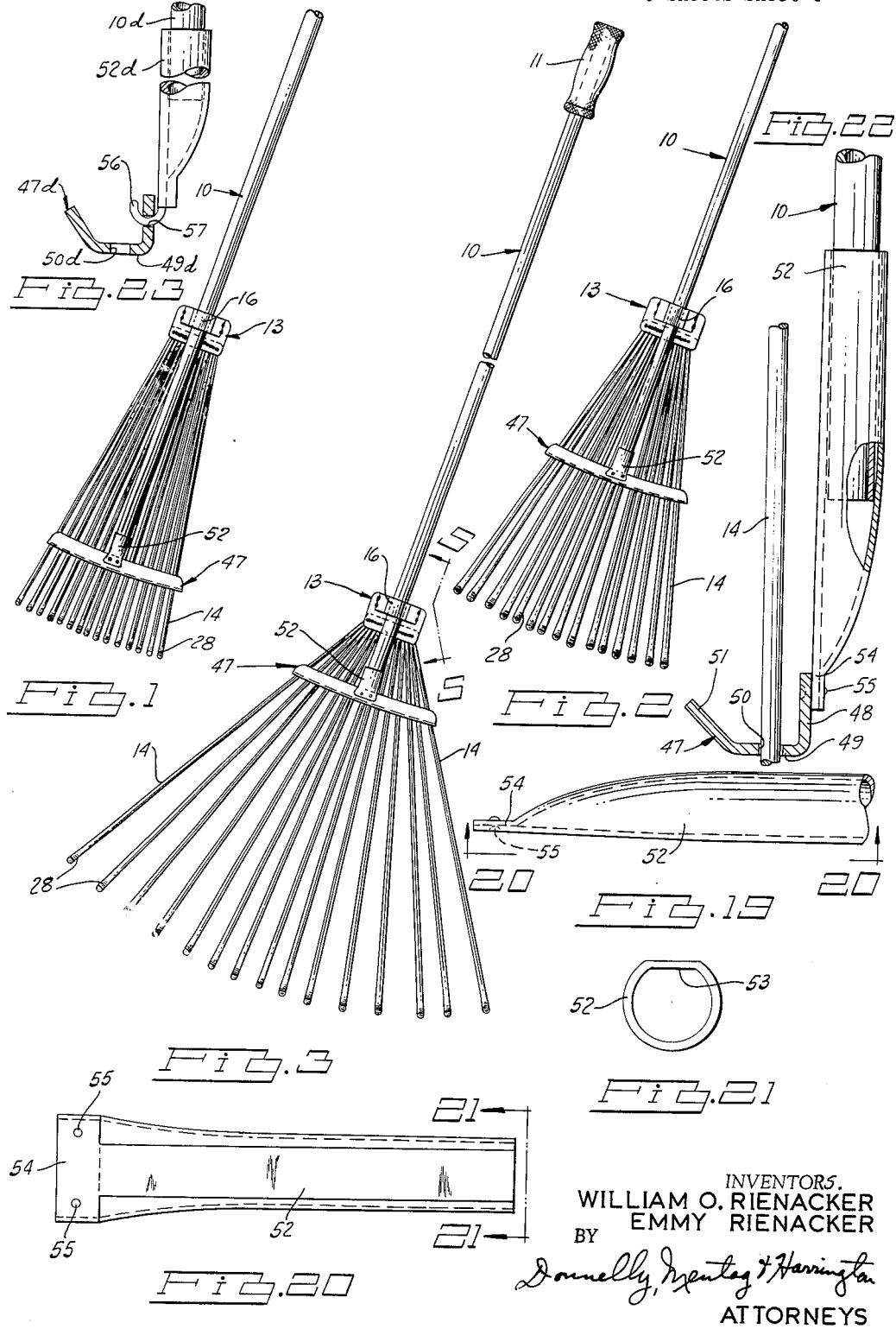

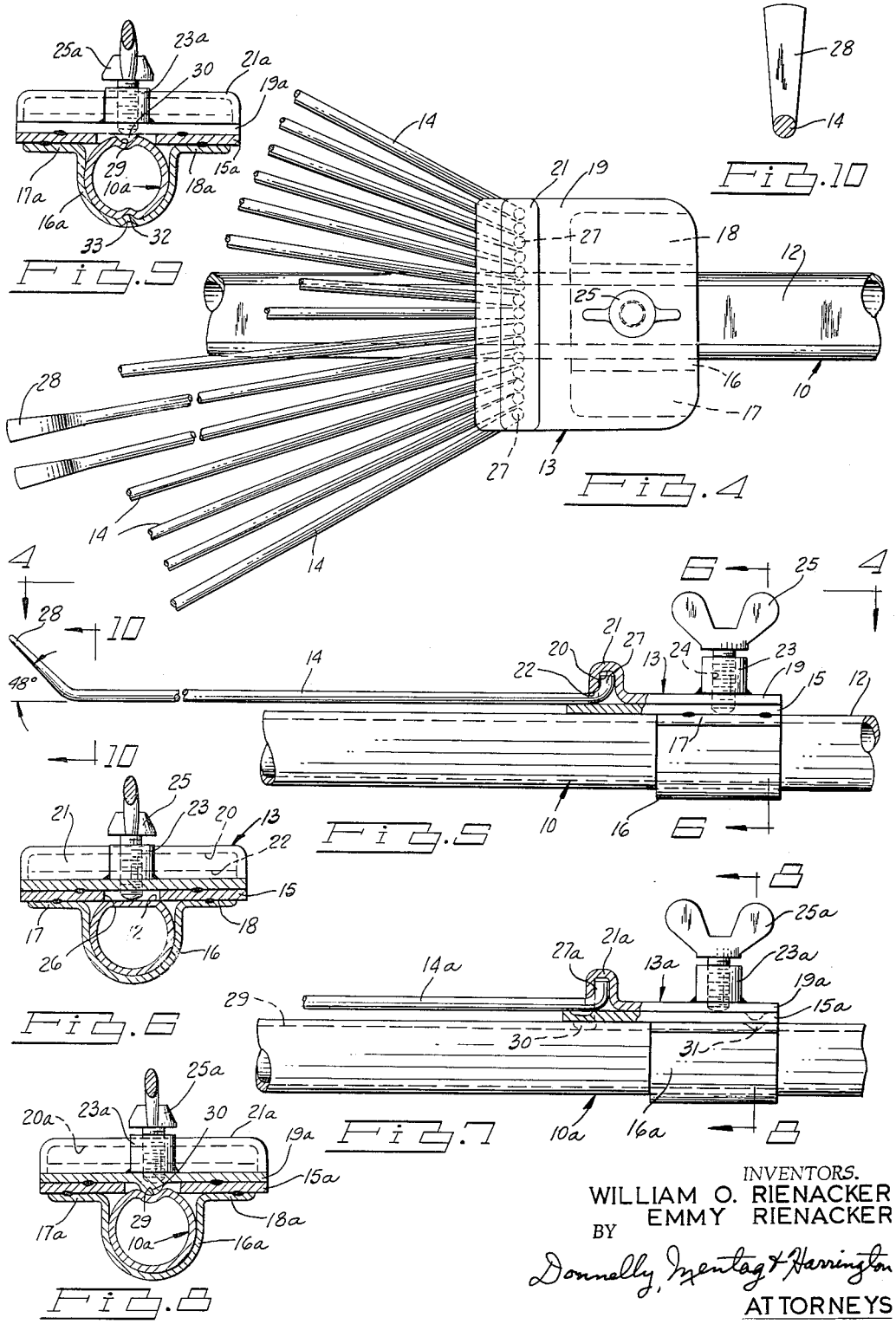

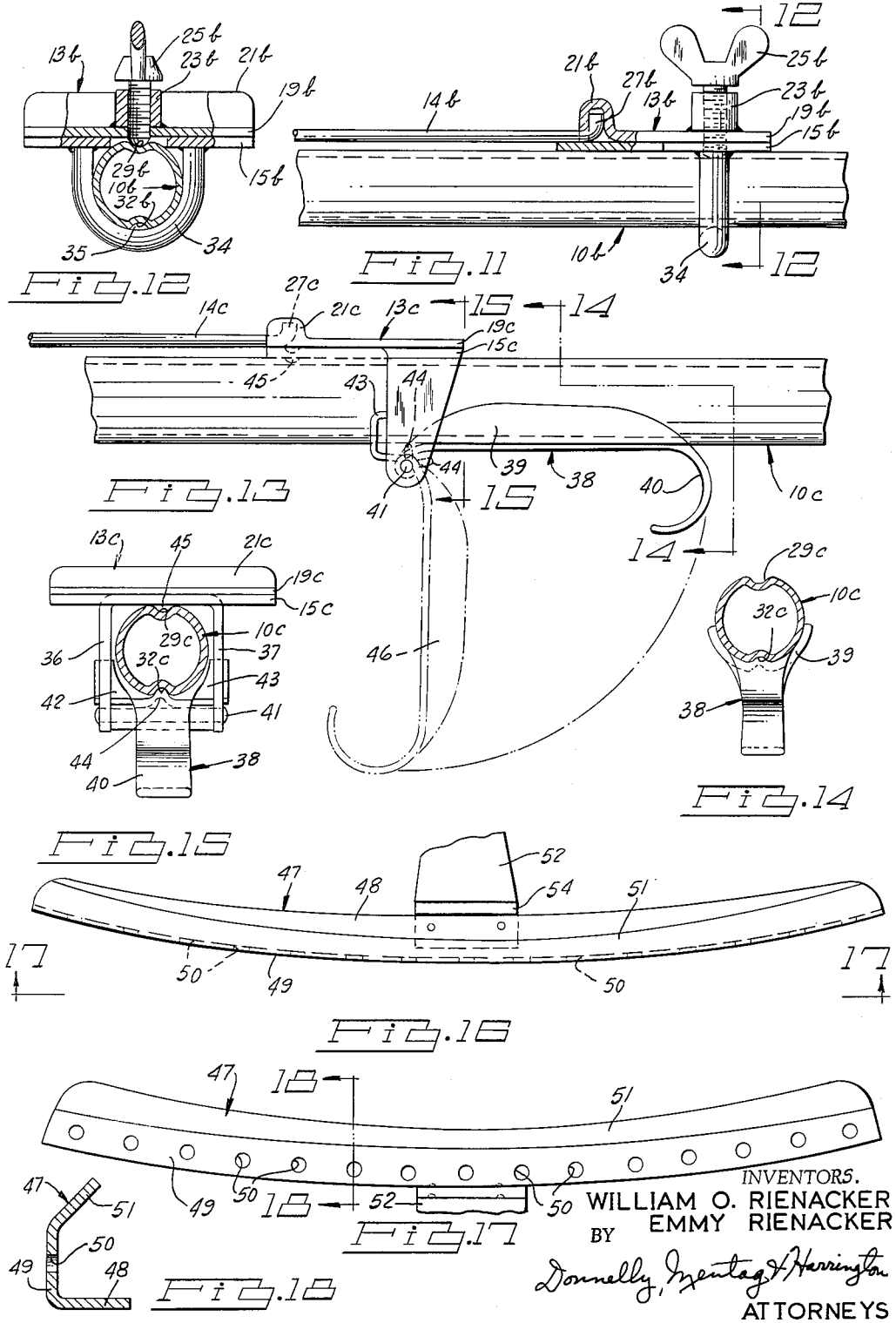

1

3,258,903
HAND CULTIVATOR OR RAKE
William O. Rienacker and Emmy Rienacker, Rte. 1,
Brimley, Mich.
Filed Nov. 22, 1963, Ser. No. 325,684
9 Claims. (Cl. 56—400.18)

This invention relates generally to hand cultivators and, more particularly, to a hand cultivator having a plurality of cultivator prongs which are hingedly secured to a handle and which are adapted to be adjustably spread in any desired position between a closed position and an open or fully expanded position.

It is an object of the present invention to provide a novel and improved hand cultivator which may be used for various purposes, as for example, gardening, farming, seeding, and loosening the ground around flowers to loosen the weeds around the flowers so that they can be easily removed. The cultivator of the present invention also may be used for raking the lawn and for raking purposes in a barn.

It is another object of the present invention to provide a novel and improved hand cultivator which is simple and compact in construction, economical of manufacture and efficient in operation.

It is still another object of the present invention to provide a novel and improved hand cultivator which includes, a handle on which is adjustably mounted a carrier member for hingedly supporting the upper end of a plurality of cultivator prongs, a spreader or guide bar which is carried on the lower end of the handle for spreading apart the lower end of the prongs, and means for adjustably securing the carrier member in selected adjusted positions on the handle.

Other objects, features and advantages of this invention will be apparent from the following detailed description, appended claims, and the accompanying drawings.

In the drawings:

FIGURE 1 is a front elevational view, with parts removed, of a hand cultivator made in accordance with the principles of the present invention;

FIGURE 2 is a view of the hand cultivator of the present invention, similar to FIGURE 1, and showing the cultivator prongs in an intermediate spread condition;

FIGURE 3 is a slightly enlarged elevational view, similar to FIGURE 1, and showing the cultivator in a fully spread condition;

FIGURE 4 is a fragmentary rear view of the hand cultivator, taken along the line 4—4 of FIGURE 5, and looking in the direction of the arrows;

FIGURE 5 is a fragmentary, enlarged, side elevational view of the structure illustrated in FIGURE 3, taken along the line 5—5 thereof, looking in the direction of the arrows, and with the structure turned over 180°;

FIGURE 6 is an elevational, sectional view of the structure illustrated in FIGURE 5, taken along the line 6—6 thereof, and looking in the direction of the arrows;

FIGURE 7 is a side elevational view, similar to FIGURE 5, of a second handle for use in a hand cultivator made in accordance with the principles of the invention;

FIGURE 8 is an elevational, sectional view of the structure illustrated in FIGURE 7, taken along the line 8—8 thereof, and looking in the direction of the arrows;

FIGURE 9 is an elevational, sectional view, similar to FIGURES 5 and 7, and showing a third handle structure which may be employed in the invention;

FIGURE 10 is a slightly enlarged, elevational sectional view of the structure illustrated in FIGURE 5, taken along the line 10—10 thereof, looking in the direction of the arrows, and showing the end of a prong adapted for use in the cultivator;

FIGURE 11 is a fragmentary, side elevational view,

2 similar to FIGURE 5, and showing a modified cultivator prong carrier means;

FIGURE 12 is an elevational, sectional view of the structure illustrated in FIGURE 11, taken along the line 12—12 thereof, and looking in the direction of the arrows;

FIGURE 13 is a side elevational view, similar to FIGURE 5, and showing a third embodiment of a cultivator prong carrier means employed in the invention;

FIGURE 14 is an elevational, sectional view of the structure illustrated in FIGURE 13, taken along the line 14—14 thereof, and looking in the direction of the arrows;

FIGURE 15 is an elevational, sectional view of the structure illustrated in FIGURE 13, taken along the line 15—15 thereof, and looking in the direction of the arrows;

FIGURE 16 is a rear elevational view of the cultivator prong guide bar;

FIGURE 17 is a bottom view of the structure illustrated in FIGURE 16, taken along the line 17—17 thereof, and looking in the direction of the arrows;

FIGURE 18 is an elevational, sectional view of the structure illustrated in FIGURE 17, taken along the line 18—18 thereof, and looking in the direction of the arrows;

FIGURE 19 is a side elevational view of a connector member for connecting the handle of the cultivator to the prong guide bar;

FIGURE 20 is a bottom plan view of the structure illustrated in FIGURE 19, taken along the line 20—20 thereof, and looking in the direction of the arrows;

FIGURE 21 is an end elevational view of the structure illustrated in FIGURE 20, taken along the line 21—21 thereof, and looking in the direction of the arrows;

FIGURE 22 is a fragmentary view, partly in section, and showing a prong guide bar connected to the handle connector member; and FIGURE 23 is a fragmentary, elevational view, partly in section similar to FIGURE 22, and showing a detachable handle connector member.

Referring now to the drawings, and in particular to FIGURES 1 through 5, the numeral 10 generally designates the handle of the hand cultivator made in accordance with the principles of the present invention. The handle may be made from any suitable material as, for example, from aluminum or steel. The handle 10 may be made to any desired length, and in one embodiment, it was made approximately 46″ long. As shown in FIGURE 3, the handle 10 is provided with a suitable hand grip member 11 which may be made from any suitable material as, for example, from rubber, plastic or the like. A suitable plastic is vinyl plastic.

As best seen in FIGURES 4, 5 and 6, the rear side of the handle 10 is provided with a flat surface 12 which extends longitudinally of the handle 10. As best seen in FIGURES 4 and 5, the hand cultivator of the present invention includes a carrier member generally indicated by the numeral 13 and which is adapted to hingedly support the upper ends of a plurality of wire rods 14 which functions as cultivator prongs. The carrier member 13 includes a flat guide plate 15 which is adapted to be slidably mounted on the flat surface 12 on the handle 10. The guide plate 15 is secured to the handle 10 for sliding relationship therewith by means of the U-shaped strap 16 which is provided with the flanges 17 and 18. The strap flanges 17 and 18 are secured to the front side of the guide plate 15 by any suitable means as by welding.

A second plate 19 is fixedly secured to the rear side of the guide plate 15 by any suitable means as by welding. As shown in FIGURE 4, the plan shape of the plate 19 is similar to the guide plate 15. As best seen in FIGURES 5 and 6, the lower end of the plate 19 is bent rearwardly, outwardly and then it is folded over so as to extend back toward the plate 15 and to form the transverse chamber indicated by the numeral 20. The chamber 20 is thus formed by the transverse outwardly extended, inverted U-shaped projection or housing indicated by the numeral 21 in FIGURE 5. As shown in FIGURE 5, the chamber 20 is open along the lower end thereof, as indicated by the numeral 22, for the reception of the upper ends of the cultivator prongs 14.

As shown in FIGURES 5 and 6, the carrier member 13 further includes a stud 23 which is fixedly secured to the rear side of the plate 19, adjacent the upper end thereof, by any suitable means, as by welding. A hole 24 is formed through the stud 23 and the plates 15 and 19, and the portion of the hole 24 inside of the stud 23 is threaded. A wing headed screw 25 is threadably mounted in the hole 24, and is adapted to have the inner end thereof pass through the hole 26 formed through the plate 15, and engage the flat surface 12 on the handle 10 to releasably secure the carrier member 13 in place.

As shown in FIGURES 4 and 5, the upper ends of the cultivator prongs 14 are bent rearwardly, outwardly at right angles to the main portion thereof so as to form the hinge arms indicated by the numeral 27. The prong hinge arms 27 are adapted to be seated in the chamber 20 in the transverse housing 21. The upper ends of the prongs 14 pass downwardly through the opening 22 which is formed between the lower end wall of the housing 21 and the rear surface of the guide plate 15. It will be seen that the hinge arms 27 secure the prongs 14 in place on the carrier member 13, but that the prongs 14 may be swung sidewise or laterally relative to each other.

As shown in FIGURES 5 and 10, the lower ends of the prongs 14 are preferably flattened and bent downwardly and inwardly at an angle of approximately 48° relative to the plane of the prongs 14. It will be understood that the prong ends 28 may also be formed substantially conical in shape, or pointed in shape, as desired.

FIGURES 7 and 8 illustrate a modified construction which may be employed in carrying out the principles of the present invention. The structure of FIGURES 7 and 8 show a modified handle and carrier construction. The parts of the structures shown in FIGURES 7 and 8 which are similar to that shown in FIGURES 5 and 6 are marked with the same reference numerals followed by the small letter "a."

As best seen in FIGURE 8, the handle 10a is provided along the rear side thereof with a longitudinally extended concave groove 29, instead of the flat surface 12. It will be understood that the flat surface 12 and the groove 29 are adapted to guide the carrier members 13 and 13a, respectively, along their respective handles and to maintain the carrier members from rotating about the handles. The guide plate 15a is provided on the upper and lower ends thereof with the forwardly extended projections 30 and 31, respectively, for sliding engagement in the groove 29 to prevent relative rotation of the carrier member 13a about the handle 10a. The projections 30 and 31 may be formed by a punching operation on the rear side of the plate 15a.

FIGURE 9 illustrates a third carrier member construction which may be employed in carrying out the principles of the present invention. The carrier member structure of FIGURE 9 is the same as that of FIGURES 7 and 8 with the added change that the handle 10a is provided with a concave, inwardly extended, longitudinally extending groove 32 which is diametrically disposed to the groove 29. The strap member 16a of FIGURE 9 is provided with an inwardly extended projection 33, which is adapted to be slidably seated in the longitudinal groove 32 formed on the front side of the handle 10a, and to assist the projections 30 and 31 which ride in the groove 29 to prevent rotation of the carrier 13a about the handle 10a.

FIGURES 11 and 12 illustrate a fourth carrier member construction for use in carrying out the principles of the present invention. The structure which is similar to that of the embodiments of FIGURES 5 and 6 have been marked with the same reference numerals, followed by the small letter "b." In the embodiment of FIGURES 11 and 12, the strap 16 has been replaced with a U-shaped retainer strap or clamp 34 which has the rear ends of the legs thereof fixedly secured to the front side of the guide plate 15b by any suitable means, as by welding. The clamp 34 may be provided with a projection 35 for slidable engagement in the groove 32b formed on the front side of the handle 10b. The locking screw 25b is adapted to engage in the groove 29b formed on the rear side of the handle 10b for locking the carrier member 13b in place, in a selected adjusted position on the handle 10b.

FIGURES 13, 14 and 15 illustrate a further carrier member construction which may be employed in carrying out the principles of the present invention. The parts of the carrier member illustrated in FIGURES 13, 14 and 15 which are similar to the embodiment of FIGURES 5 and 6 have been marked with similar reference numerals followed by the small letter "c." In this embodiment, the structure for locking the carrier member 13c to the handle 10c has been changed. As best seen in FIGURES 13 and 15, the guide plate 15c is provided with a pair of spaced apart, forwardly extended integral arms 36 and 37 which are adapted to straddle the handle 10c. Hingedly mounted between the arms 36 and 37 is a friction locking lever generally indicated by the numeral 38.

The friction locking lever 38 is provided with an elongated U-shaped body portion 39 which is adapted to be positioned on the front side of the handle 10c. The upper end of the body portion 39 is provided with the integral finger grip portion 40. The lower end of the body portion 39 is hingedly mounted between the guide plate arms 36 and 37 by means of the transverse shaft or pin 41. The body member 39 is also provided on the lower end thereof with the rearwardly extended projection 44 which is adapted to be frictionally seated in the groove 32c, which is formed on the front side of the handle 10c, when the friction locking lever 38 is swung to the solid line position shown in FIGURE 13 so as to grip the handle 10c and secure it to the carrier member 13c. The carrier member 13c may also be provided with the forwardly extended projection 45 for engagement in the longitudinal groove 29c on the rear side of the handle 10c. When the locking lever 38 is moved to the dotted line position shown by the number 46 in FIGURE 13, the projection 44 will be unlocked or released from gripping engagement from the handle 10c. The brackets 42 and 43, as shown in FIGURES 13 and 15, are fixedly secured to the guide plate arms 36 and 37 and have curved inner sides so as to engage the curved sides of the handle 10c and prevent the carrier 13c from shifting laterally on the handle 10c. The bracket members 42 and 43 may also be provided with downward extensions which are disposed between the arms 36 and 37 and through which is adapted to pass the shaft 41. These downward extensions function as spacing members for the locking member 38 which is pivoted therebetween.

The lower ends of the prongs 14 are adapted to be retained in laterally spaced apart positions by means of the guide bar generally indicated by the numeral 47 in FIGURES 16, 17, 18 and 22. As shown in FIGURE 2 and 16, the guide member 47 is provided with a compound curvature. The guide bar 47 includes the transverse front wall 48 which is disposed substantially in the plane of the prongs 14. Integrally connected to the lower end of the wall 48 is the bottom wall 49 which is substantially perpendicular to the wall 48 and through which is formed a plurality of prong guide holes 50. The guide bar 47 further includes the rear wall 51 which is integrally connected at the inner end thereof to the bottom wall 49 and which extends outwardly at an angle from the wall 49. As shown in FIG. 2, the guide bar 47 is substantially channel shaped or U-shaped in cross section. The sloping rear wall 51 provides the guide bar with good rigidity characteristics and acts as a stiffener member.

As shown in FIGURES 1 and 22, the lower end of the handle 10 is received in the upper end of a handle connector 52. As shown in FIGURE 21, the handle connector 52 is provided with a internal configuration similar to the configuration of the handle 10 so that it has a flat longitudinally extended portion 53 which is adapted to mate with the flat portion 12 on the handle 10. The handle 10 may be fixedly secured in the connector member 52 by any suitable means, as by means of a force fit. The lower end of the connector member 52 is squeezed together to form the flat portion 54 which is adapted to be seated on the front side of the guide bar wall 48 and to be connected thereto by any suitable means, as by welding. The flat portion 54 of the connector 52 may be provided with the punch marks 55 for welding purposes, if desired.

It will be understood that the prongs 14 may be made to any desired length and from any gauge wire rod material. As, for example, the prongs 14 may be approximately 20" long and made from No. 10½ gauge wire rod. The holes 50 in the guide bar 47 are made large enough so as to provide a free sliding action between the prongs 14 and the guide bar 47. The various parts of the spreader may be made from any suitable material as, for example, a light weight metal or aluminum.

In use, the screw 25 or the locking lever 38, depending on which structure is used, would be unlocked from the handle of the cultivator to permit the operator to move the handle relative to the carrier member 13 so as to move the guide bar 47 upwardly or downwardly. It will be seen that by moving the handle relative to the carrier member 13, the prongs 14 will be opened or closed in accordance with the movement of the guide bar 47. With the guide bar 47 in the position shown in FIGURE 1, in a lowered position, the prongs 14 will be drawn together whereas when the guide bar 47 is moved upwardly to the position shown in FIGURE 3, the prongs 14 will be spread apart. In one embodiment the prongs were adapted to be spread from a width of from 7½" to a width of 22". Experience has shown that the hand cultivator of the present invention is a most efficient and practical tool. It will be understood that the carrier member 13 is locked in place relative to the handle 10 when the guide bar 47 has been moved to the desired position to provide the desired spread of the prongs 14.

FIGURE 23 illustrates a modified guide bar connector member 52d. In this embodiment the parts which are similar to the parts of the first embodiment of FIGURES 1 through 6 have been marked with the same reference numerals followed by the small letter "d." In this embodiment the handle connector 52d is adapted to be quickly and easily detached from the guide bar 47d. The handle connector 52d is provided on the lower end thereof with a suitable hook-like member 56 which is adapted to be engaged with the hole 57 formed in the wall 49d of the guide bar 47d. It will be seen that the handle 10d may be quickly detached from the guide bar 47d, as desired.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What we claim is:

1. A hand cultivator comprising, an elongated handle; a carrier member slidably mounted on said handle; a guide bar carried on the lower end of said handle; a plurality of elongated cultivator prongs; said carrier member having longitudinally spaced walls on the rear side thereof disposed transversely of and perpendicular to the longitudinal axis of said handle which define a transverse chamber; the upper ends of said prongs being turned perpendicularly outward relative to the longitudinal axis of said handle and being hingedly disposed in said chamber on said carrier member between said walls and retained therebetween for free swinging movement of said prong upper ends; said guide bar being provided with a plurality of laterally spaced apart holes through each of which is slidably mounted one of said prongs; and, means for detachably locking said carrier member to said handle in a selected adjusted position on the handle.

2. A hand cultivator as defined in claim 1, wherein: said means for detachably locking said carrier member to said handle includes a clamp member mounted around said handle and secured to said carrier member, and, a screw threadably mounted on said carrier member and adapted to be threaded into engagement with said handle for securing said carrier member to said handle.

3. A hand cultivator as defined in claim 2, wherein: said handle is provided with a longitudinally extended flat surface for engagement by said screw.

4. A hand cultivator as defined in claim 1, wherein: said guide bar is fixedly connected to the lower end of said handle.

5. A hand cultivator as defined in claim 1, wherein: said guide bar is detachably connected to the lower end of said handle.

6. A hand cultivator comprising, an elongated handle; a carrier member slidably mounted on said handle; a guide bar carried on the lower end of said handle; a plurality of elongated cultivator prongs; said carrier member having a transversely disposed chamber on the rear side thereof; the upper ends of said prongs being hingedly disposed in said chamber on said carrier member; said guide bar being provided with a plurality of laterally spaced apart holes through each of which is slidably mounted one of said prongs; means for detachably locking said carrier member to said handle in a selected adjusted position on the handle; said means for detachably locking carrier memger to said handle including a clamp member mounted around said handle and secured to said carrier member, and, a screw threadably mounted on said carrier member and adapted to be threaded into engagement with said handle for securing said carrier member to said handle; and, said handle being provided with a longitudinally extended groove for engagement by said screw.

7. A hand cultivator comprising, an elongated handle; a carrier member slidably mounted on said handle; a guide bar carried on the lower end of said handle; a plurality of elongated cultivator prongs; said carrier member having a transversely disposed chamber on the rear side thereof; the upper ends of said prongs being hingedly disposed in said chamber on said carrier member; said guide bar being provided with a plurality of laterally spaced apart holes through each of which is slidably mounted one of said prongs; means for detachably locking said carrier member to said handle in a selected adjusted position on the handle; said means for detachably locking said carrier member to said handle including a clamp member mounted around said handle and secured to said carrier member, and a screw threadably mounted on said carrier member and adapted to be threaded into engagement with said handle for securing said carrier member to said handle; and, said handle being provided with a longitudinally extended groove for engagement by said screw and for engagement by projections mounted on said carrier member and extending into said groove to prevent rotation of the carrier member about the handle.

8. A hand cultivator comprising, an elongated handle; a carrier member slidably mounted on said handle; a guide bar carried on the lower end of said handle; a plurality of elongated cultivator prongs; said carrier member having a transversely disposed chamber on the rear side thereof; the upper ends of said prongs being hingedly disposed in said chamber on said carrier member; said guide bar being provided with a plurality of laterally spaced apart holes through each of which is slidably mounted one of said prongs; means for detachably locking said carrier member to said handle in a selected adjusted position on the handle; said means for detachably locking said carrier member to said handle including a clamp member mounted around said handle and secured to said carrier member, and, a screw threadably mounted on said carrier member and adapted to be threaded into engagement with said handle for securing said carrier member to said handle; said handle being provided with a first longitudinally extended groove for engagement by said screw and for engagement by projections mounted on said carrier member and extending into said groove to prevent rotation of the carrier member about the handle; and, said handle being further provided with a second longitudinally extended groove for engagement by a projection mounted on said clamp member.

9. A hand cultivator comprising, an elongated handle; a carrier member slidably mounted on said handle; a guide bar carried on the lower end of said handle; a plurality of elongated cultivator prongs; said carrier member having a transversely disposed chamber on the rear side thereof; the upper ends of said prongs being hingedly disposed in said chamber on said carrier member; said guide bar being provided with a plurality of laterally spaced apart holes through each of which is slidably mounted one of said prongs; means for detachably locking said carrier member to said handle in a selected adjusted position on the handle; and, said carrier member including a pair of arms extended forwardly on opposite sides of said handle, and a lever having one end pivotally mounted between said arms and having a projection thereon adapted to engage said handle and frictionally grip the same to hold the carrier member in a locked position on the handle when the lever is moved to a first position and to disengage said projection from engagement with the handle when the lever is moved to a second position.

References Cited by the Examiner
UNITED STATES PATENTS

| | | | |
|---|---|---|---|
| 1,149,098 | 8/1915 | Tanaka | 56—400.18 |
| 2,904,951 | 9/1959 | Glover | 56—400.18 |

ANTONIO F. GUIDA, *Acting Primary Examiner.*

RUSSELL R. KINSEY, *Examiner.*